(No Model.)
C. C. SHULTS.
CHILD'S CARRIAGE.
No. 423,089. Patented Mar. 11, 1890.
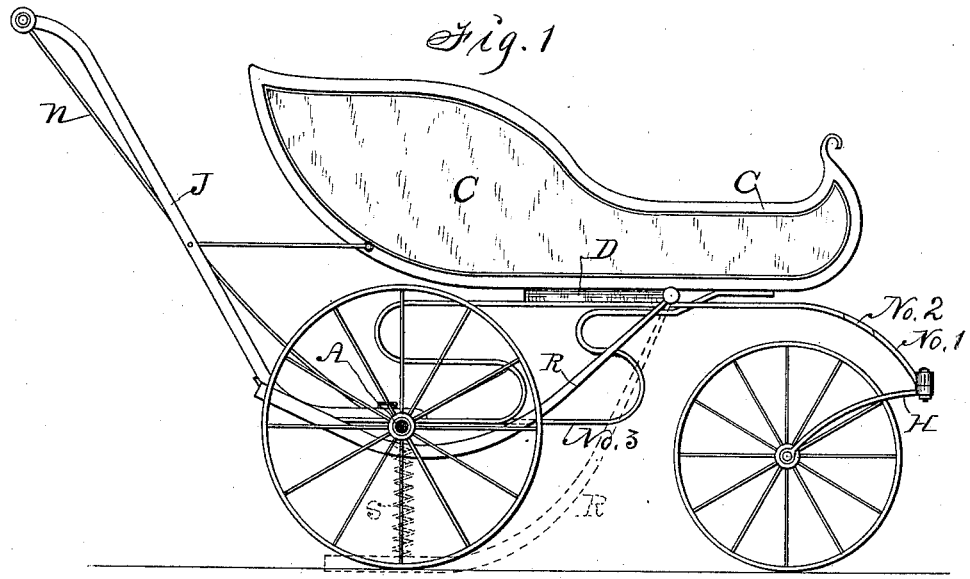
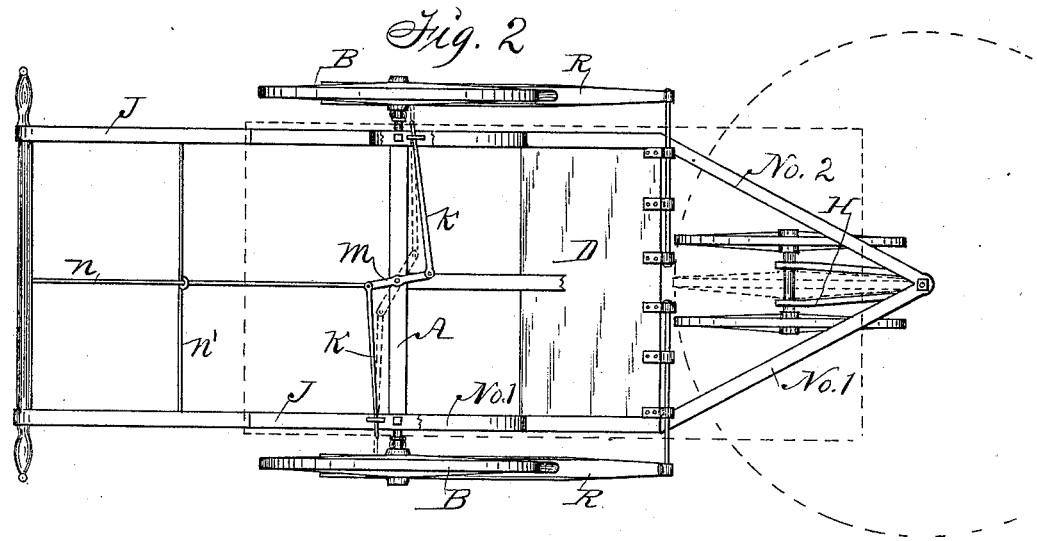

UNITED STATES PATENT OFFICE.

CHANCY C. SHULTS, OF WINTERSET, IOWA.

CHILD'S CARRIAGE.

SPECIFICATION forming part of Letters Patent No. 423,089, dated March 11, 1890.

Application filed January 9, 1890. Serial No. 336,451. (No model.)

*To all whom it may concern:*

Be it known that I, CHANCY C. SHULTS, a citizen of the United States, residing at Winterset, in the county of Madison and State of Iowa, have invented an Improved Child's Carriage, of which the following is a specification.

My invention consists in the construction and combination of three springs, an axle on two wheels, and a wheel-bearing frame to support and carry a box, the construction and combination of a wheel-locking device with the axle and wheels, and the construction and combination of detachable sleigh-runners with the wheels, as hereinafter set forth, pointed out in my claims, and illustrated in the accompanying drawings, in which—

Figure 1 is a side view of the complete carriage, showing a runner for the rear wheel elevated and suspended in an inoperative position. Fig. 2 is a top view showing the box removed and two wheels connected with the wheel-bearer at the front.

A is a straight axle supported upon two wheels B in a common way.

1 and 2 are leaf-springs, composed of single flat pieces of steel bent into S shape at their rear ends and inclined laterally in opposite directions at their front ends, where they are connected.

3 is a leaf-spring bent into S shape at its center. Its rear and lower end is fixed to the center of the axle A, and its front and top end is fixed to the bottom and center of the front portion of a box or body C.

The springs 1 and 2 are connected at their rear portions by means of a cross-piece and box-support D, upon which the rear portion of the box or body C is fixed by means of screws or in any suitable way.

H is a wheel-bearer pivoted to the united front ends of the springs 1 and 2 in such a manner that one or two wheels mounted in the bearer will support the front ends of the springs and the body C and accommodate themselves to the motion of the carriage, so that a person pushing the carriage can change the direction of the line of advance, turn about, or move backward and forward without lifting the front of the carriage. The front wheels, having a swivel-connection with the front ends of the springs, are thereby allowed to move around the center of motion of their bearer, as indicated by dotted lines in Fig. 2.

J is a frame fixed to the axle by means of bolts or in any suitable way, to serve as a handle for pushing and pulling the complete carriage.

$k$ are straight bars connected with the ends of a short bar $m$, that is pivoted to the center of the axle A in such a manner that they can be simultaneously projected outward between the spokes of the wheels B to lock the wheels.

$n$ is a rod connected with one end of the bar $m$ and extended up through a bearing $n'$, fixed to the side pieces of the frame J in such a manner that the weight of the rod will actuate the pivoted bar $m$, as required to project the bars $k$ in reverse ways and into the wheels B to lock them. A hook on the top end of the rod, inserted in a ring or staple attached to the cross-piece of the frame J, will, when the rod is lifted and the bars withdrawn from the wheels, retain the locking device inoperative.

To convert the carriage into a sleigh, I pivot or hinge runners R to the springs or body in such a manner that they can be placed under the wheels or suspended inoperative at the sides of the wheels. Grooves in the tops of the runners admit the rims of the wheels.

Springs S, fixed to the runners and the axle, will in their normal condition hold the runners suspended, and when the springs are stretched and the runners placed under the wheels the force stored in the springs will retain the runners and wheels united.

I claim as my invention—

1. A running-gear for a child's carriage, composed of an axle mounted upon two wheels, two springs S-shaped at their rear and lower ends and fixed to the end portions of the axle and bent toward each other and united at their front ends, a cross-piece fixed to their central and top parallel portions, an S-shaped spring fixed to the central part of the axle to extend forward to be connected with the bottom and fore part of a box, a wheel-bearer carrying one or two wheels pivoted to the united front ends of the two mating springs, and a frame or handle fixed to the axle to project upward and rearward, for the purposes stated.

2. The axle A upon wheels B, the springs 1 and 2, fixed to the axle and united at their front ends, the cross-piece D, the spring 3, the wheel-bearer H, carrying one or two wheels, the frame and handles J, and a box or body C, arranged and combined substantially as shown and described, for the purposes stated.

CHANCY C. SHULTS.

Witnesses:
G. W. SEEVERS,
NELSON LITTON.